United States Patent
Stephenson

(10) Patent No.: US 6,215,540 B1
(45) Date of Patent: *Apr. 10, 2001

(54) LIGHT MODULATING LAYER WITH DIFFERENT TRANSMISSIVE STATES WITH CONDUCTIVE PIXEL AREAS FORMED FROM A PHOTOSENSITIVE LAYER

(75) Inventor: Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/131,755

(22) Filed: Aug. 10, 1998

(51) Int. Cl.⁷ ................................................. G02F 1/1343
(52) U.S. Cl. ............................................................ 349/139
(58) Field of Search ............................... 349/2, 139, 187, 349/33; 428/1

(56) References Cited

U.S. PATENT DOCUMENTS

| | | | |
|---|---|---|---|
| 3,989,356 | * 11/1976 | Altman | 349/139 |
| 4,881,110 | * 11/1989 | Braatz et al. | 349/139 |
| 5,912,716 | * 6/1999 | Stephenson | 349/2 |
| 5,943,067 | * 8/1999 | Kong | 428/1 |
| 5,958,634 | * 9/1999 | Stephenson | 349/139 |
| 5,990,994 | * 11/1999 | Stephenson | 349/2 |
| 6,067,134 | * 5/2000 | Akiyama et al. | 349/74 |

* cited by examiner

Primary Examiner—Walter J. Malinowski
(74) Attorney, Agent, or Firm—Raymond L. Owens; Stephen H. Shaw

(57) ABSTRACT

A display for presenting image forming light to a viewer, includes a transparent substrate; a transparent, electrically conductive layer formed over the transparent substrate; a light modulating layer formed over a portion of the transparent, electrically conductive layer being effective in a first stable state to reflect light and in a second stable state to transmit light; and a layer formed over the light modulating layer which includes separate conductive portions. Electrical connections are provided which are selectively connected to separate conductive portions and being effective in a first condition to apply a first field across selected portions of the light modulating layer which correspond to separate conductive portions to be in the first stable state to reflect light and to apply a second field across selected separate conductive portions of the light modulating layer which correspond to separate conductive portions to be in the second stable state to transmit light.

11 Claims, 5 Drawing Sheets

LIGHT MODULATING LAYER WITH DIFFERENT TRANSMISSIVE STATES WITH CONDUCTIVE PIXEL AREAS FORMED FROM A PHOTOSENSITIVE LAYER

CROSS REFERENCE TO RELATED APPLICATIONS

Reference is made to commonly-assigned U.S. patent application Ser. No. 08/961,056 filed Oct. 30, 1997, entitled "Single Sheet Display Having Patternable Conductive Traces" by Stanley W. Stephenson; commonly-assigned U.S. patent application Ser. No. 08/990,891 filed Dec. 15, 1997, entitled "Method of Producing a Display Having Patternable Conductive Traces" by Stanley W. Stephenson; commonly-assigned U.S. patent application Ser. No. 08/990,853 filed Dec. 15, 1997, entitled "A Sheet Having Patternable Conductive Traces for Use in a Display" by Stanley W. Stephenson; and commonly-assigned U.S. patent application Ser. No. 09/027,321 filed Feb. 20, 1998, now issued as U.S. Pat. No. 5,912,716 entitled "Selectively Presenting Viewable and Conductive Images" by Stanley W. Stephenson, the disclosures of which are incorporated herein by reference.

FIELD OF THE INVENTION

The present invention relates to image displays which can selectively transmit or reflect light.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

A structure is disclosed in PCT/WO 97/04398, entitled "Electronic Book With Multiple Display Pages" which is a thorough recitation of the art of thin, electronically written display technologies. Disclosed is the assembling of multiple display sheets that are bound into a "book", each sheet provided with means to individually address each page. The patent recites prior art in forming thin, electronically written pages, including flexible sheets, image modulating material formed from a bistable liquid crystal system, and thin metallic conductor lines on each page. Various ways are disclosed to produce said conductor lines including photolithography, but not selective exposure and photographic development of traces from a photosensitive emulsion. One disadvantage of this structure is that individual pages are bound together and that many multi-layer conductors must pass across the pages to interconnect at the spine of the book.

Fabrication of flexible, electronically written display sheets are disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operate on the liquid crystal material to expose display areas. The display ceases to present an image when de-energized. Kaychem Industries form electrical flexible displays interconnection by offsetting the two sheets and contacting trace conductors from each of the two sheets.

The prior art typically requires multiple, separate layers to build up the display. The electrical traces and transparent conductive layers are typically formed through repeated vacuum deposition and photolithography of materials on the substrate. These processes are expensive and require long processing times on capital intensive equipment. Because most display structures are formed of glass, two sheets are used and are offset to permit connection to two separate and exposed sets of traces that are disposed on separate sheets In the case of electronic display means, power must be provided to view images. Printed sheets receive ink and cannot be rewritten. In the case of magnetically written media such as magnetic areas on the back of credit cards, the information is not readable.

SUMMARY OF THE INVENTION

Accordingly, it is an object of the present invention to provide a display apparatus which uses a minimum number of layers for changing the transmissivity of image forming light.

Another object is to provide a display that can be re-written using electronic means.

These objects are achieved by a display for presenting image forming light to a viewer, comprising:

(a) a transparent substrate;

(b) a transparent, electrically conductive layer formed over the transparent substrate;

(c) a light modulating layer formed over a portion of the transparent, electrically conductive layer being effective in a first stable state to reflect light and in a second stable state to transmit light;

(d) a layer formed over the light modulating layer which includes separate conductive portions; and (e) electrical conduction means being adapted to be selectively connected to separate conductive portions and being effective in a first condition to apply a first field across selected portions of the light modulating layer which correspond to separate conductive portions to be in the first stable state to reflect light and to apply a second field across selected separate conductive portions of the light modulating layer which correspond to separate conductive portions to be in the second stable state to transmit light.

Displays made in accordance with the present invention can be used to provide a rewritable image display sheet. The sheet can be formed using inexpensive, fast photographic means to expose and develop a display. A single large volume of sheet material can be coated and formed into various types of sheets and cards.

Advantageously, sheets which form displays can be made from simple coatings, and they receive and retain a viewable image with a simple writer and retain the image data without a power source. Displays in the form of sheets in accordance with the present invention are inexpensive, simple and fabricated using low-cost processes

BRIEF DESCRIPTION OF THE DRAWINGS

FIG. 3b is a magnified view of a portion of the display sheet of FIG. 3a;

FIG. 5b is a side sectional view showing of the printer of FIG. 5a;

DETAILED DESCRIPTION OF THE PREFERRED EMBODIMENT

Figure 1:
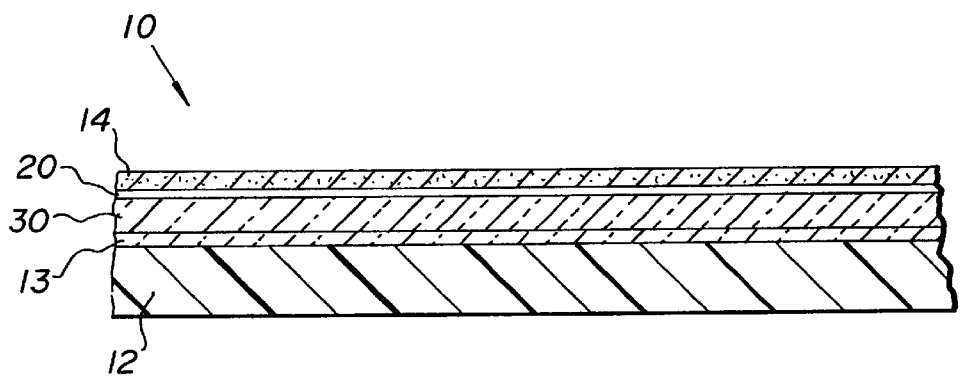
FIG. 1 is a sectional view of a display sheet in before it has been completed in accordance with the present invention.

FIG. 1 depicts a sectional view of an incomplete display sheet 10 used in the invention. The display sheet 10 includes a substrate 12. Substrate 12 can be made of a transparent polymeric material, such as Kodak Estar film base formed of polyester plastic, and have a thickness of between 20 and 200 microns. For example, substrate 12 can be a 80 micron thick sheet of polyester. Other polymers, such as transparent polycarbonate, can also be used. An optically transparent, electrically conductive layer 13 is formed over the substrate 12. The transparent, electrically conductive layer 13 can be formed of tin-oxide or Indium-Tin-Oxide (ITO), with ITO being the preferred material. Typically, the transparent, electrically conductive layer 13 is sputtered onto the substrate 12 to a resistance of less than 250 ohms per square.

A light modulating layer 30 is formed over the transparent, electrically conductive layer 13. Light modulating layer 30 is formed from a chiral doped nematic liquid crystal such as those disclosed in U.S. Pat. No. 5,695,682. A chiral doped nematic liquid crystal material is supported in a binder of hardened gelatin. The nematic liquid crystal has a chiral dopant that reflects light in a first. homeotropically aligned state. For an example of a imager which uses liquid crystals see U.S. Pat. No. 4,603,945.

The liquid crystal molecules start in a pitched formation across the light modulating layer 30, and the twist (or chirality) of the molecules is set to reflect a wavelength of visible light. A first, low voltage electric field can disrupt the orderly pitch of the material and the material switches to a focal-conic texture that is a hazy and light diffusing. If the field strength increased, the material becomes optically clear, In this transparent state, incident light passes through light modulating layer 30 and onto a light absorbing layer, which creates "black". See, for example, the '682 patent cited above. If the voltage is switched off in this state, the material snaps to the original, light reflecting condition. If the voltage is removed at a slower rate, the display will return to a light transmitting, black state. The transition to the light transmitting state is progressive, and varying the time that the voltage is removed permits a variable level of-reflection. These variable levels can be mapped out to corresponding gray levels, and when the field is removed, light modulating level 30 maintains a given optical state indefinitely.

For another approach, for creating gray levels in Hashimoto et al, "Reflective Color Display Using Cholesteric Liquid Crystals", SID 98 Digest, Article 31.1, 1998, pp. 897–900. A first, high voltage pulse clears all pixels, and a second, lower voltage pulse puts the liquid crystal molecules in the focal-conic scattering mode. The pulse time of a third, intermediate voltage pulse returns the liquid crystal material to different degrees of reflectivity based on the time of the third voltage pulse.

The light modulating layer 30 preferably includes liquid crystal material from a polymeric a binder such as a UV curable polymer, an epoxy, and in this invention de-ionized gelatin or polyvinyl alcohol (PVA). The binder content can be between 0.5% and 20.0% of the material in the modulating material and permits such materials to have a "memory" for either a reflective or transitive state. Compounds such as gelatin and PVA are machine coatable on equipment associated with photographic films.

It is important that the binder have a low ionic content. The presence of ions in such a binder hinders the development of an electrical field across the dispersed liquid crystal material. Additionally, ions in the binder can migrate in the presence of an electrical field, chemically damaging the light modulating layer 30

The layer thickness, the structure of the polymer network within the liquid crystal material designed to optimize the reflection and transmission of light through light modulating layer 30. Other bi-stable materials can also-be used for light modulating layer 30, such as electro-chromic or micro-spherical particles. The light modulating layer 30 is effective in two conditions, which will be described in more detail below. Light modulating layer 30 will have low strength at low polymer concentrations, and photosensitive layer 14 can serve as a protective, stabilizing cover over a weak light modulating layer 30.

A barrier layer 20 is coated over light modulating layer 30. Barrier layer 20 protects light modulating layer 30 from processing chemicals used on display sheet 10. Barrier layer 20 can be a layer of de-ionized gelatin or PVA that has been polymerized to resist ionic diffusion into light modulating layer 30. A photosensitive layer 14 is coated over barrier layer 20. The photosensitive layer 14 must form metal deposits of conductivity sufficient to carry a field to operate on the light modulating layer 30, and is preferably an emulsion of silver halide grains. Alternatively, other photosensitive materials can be used, such as gold or copper salts. In the case of silver halide emulsions, high concentrations of crystalline silver halide in a binder, such as gelatin or PVA, are used to improve conductivity over conventional imaging emulsions. Conductive additives such as fine Indium-Tin-Oxide or fine silver with particle sizes between 0.5 and 2 microns can be added to the emulsion to improve the electrical conductivity of photographically produced metallic silver.

Figure 2:
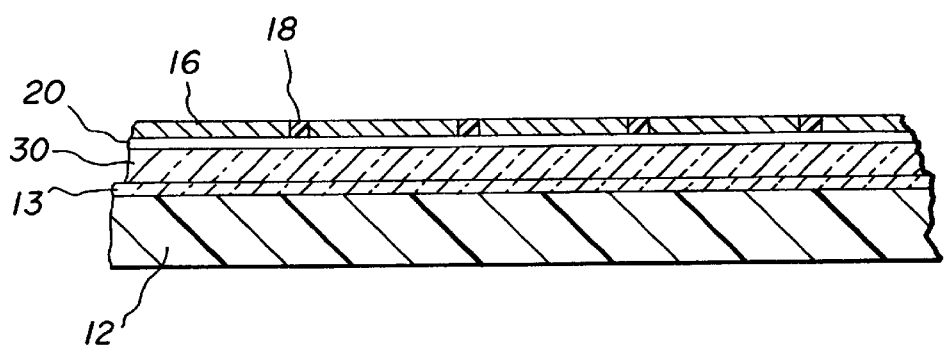
FIG. 2 is a sectional view of the sheet of FIG. 1 in a completed condition.

FIG. 2 is a sectional view through the display sheet 10 after processing. The photosensitive layer 14 has been exposed and processed to create conductive areas 16 and non-conductive areas 18, as shown in FIG. 2. Conductive areas 16 should have sheet resistance equal to or greater than the sheet resistance of the transparent, electrically conductive layer 13. Sheet resistivity of less than 200 ohms per square have been formed and will operate on light modulation layers 30. When silver halide grains in gelatin are used for the photosensitive layer 14, conductive areas 16 are metallic silver formed from exposed silver halide grains in the unprocessed display sheet 10. Conductive areas 16 appear black, having an optical density of greater than 2.0 D. The light absorbing characteristic of conductive areas 16 provide the "black" level for the display. Unexposed silver halide in non-conductive areas 18 has been removed by conventional photographic development processes to define the extent of conductive areas 16. Non-conductive areas 18 are typically gaps in developed silver approximately 5–50 microns wide that electrically isolate electrically conductive areas 16. Non-conductive areas 18 should be fine enough that photosensitive layer 14 appears to be uniformly black.

The transparent, electrically conductive layer 13 provides a continuous electrode across light modulating layer 30. An electrical field across conductive areas 16 and transparent, electrically conductive layer 13 will operate on light modulating layer 30 to selectively permit either reflection or absorption of light in conductive areas 16.

Figure 3A:
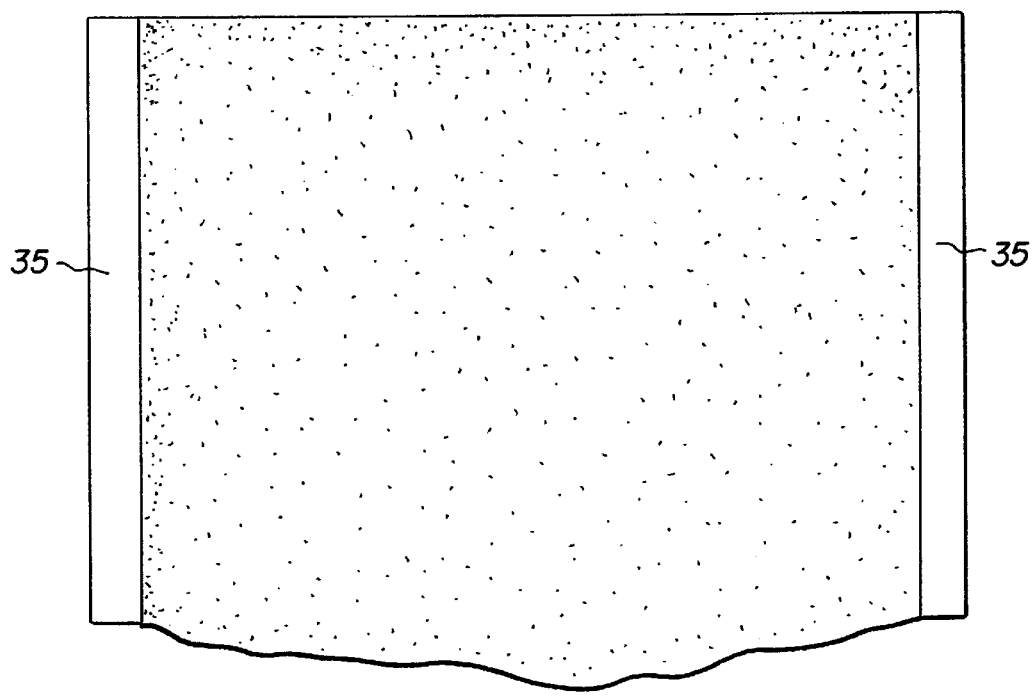
FIG. 3a is a partial top view of the completed display sheet of FIG. 2.

FIG. 3a is a partial top view of the completed sheet. Conductive areas 16 and non-conductive areas 18 cover the majority of the sheet, and power areas 35 have been formed on two sides of display sheet 10. Power areas 35 are areas on display sheet 10 with all coatings removed with the exception of transparent, electrically conductive layer 13. Layers above the transparent electrically conductive layer 13 are removed to form power areas 35. Such removal can be accomplished by chemical etching. Power areas 35 are areas that permit electrical connection to transparent, electrically conductive layer 13.

Figure 3B:
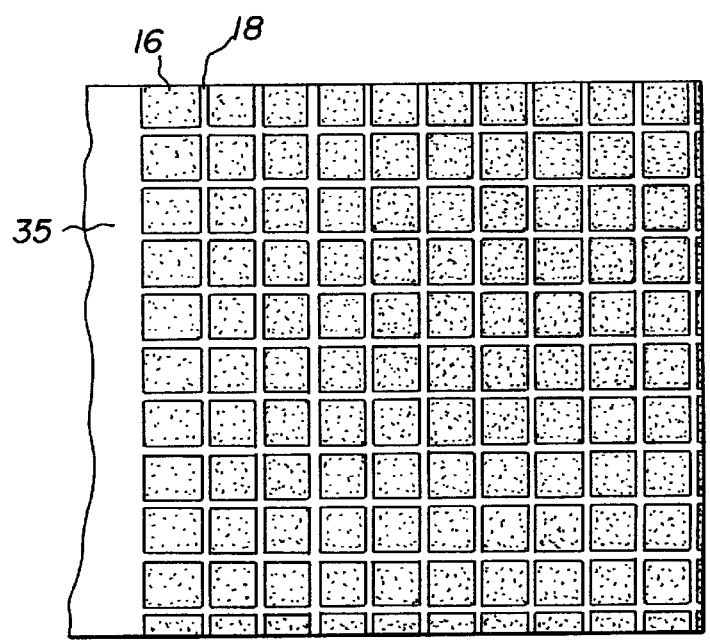

FIG. 3b is a magnified rear view of a portion of the surface of display sheet 10. Conductive areas 16 are small pads of conductive silver that define pixel elements on display sheet 10. Non-conductive area 18 define a fine silver-free mesh that limits each conductive area 16. Preferably, nonconductive areas 18 can be 25 micron across, and non-conductive area 18 can be 10 microns apart. Typical display resolutions require 150 dots per inch (75 micron pitch) for readability. The size of the pixels permits 4 to 9 conductive areas 16 per a 300 dpi pixel. Nonconductive areas 18 are required to limit an electrical field operating between transparent, electrically conductive layer 13 and conductive areas 16. When the light modulating layer 30 is employed in a display sheet 10 which is effective in only two states, in the first state light modulating layer 30 transmits light, which is absorbed by conducting areas 16, and in the second state the light modulating layer 30 reflects light over conductive areas 16. Defined areas of light absorption and light reflectance create "black" and "white" areas respectively, permitting the recording of text or image data.

Figure 4A:
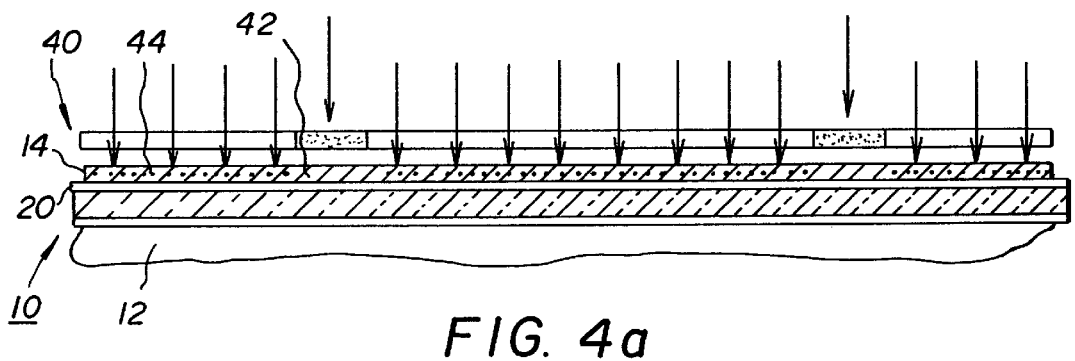
FIGS. 4a–4c show various steps in the formation of the conductive pixels of the display sheet of FIG. 2 in accordance with the present invention.
Figure 4B:
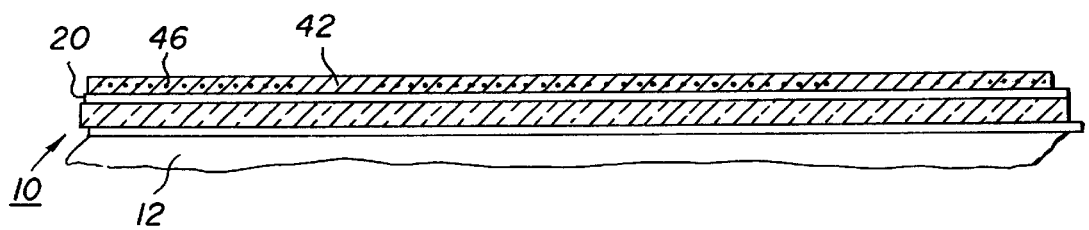
Figure 4C:
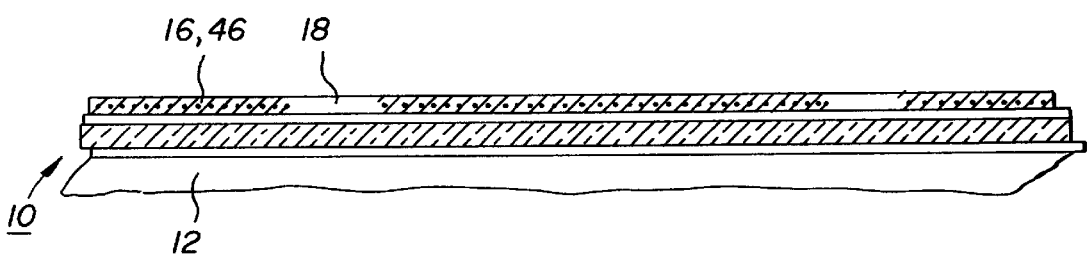

FIGS. 4a–4c are schematic representations of various steps in showing how conductive areas 16 are formed in the photosensitive layer 14. Unexposed silver halide 42 is the light sensitive material of the photosensitive layer 14. In FIG. 4a, photo-mask 40 selectively blocks a source of light that strikes and exposes exposed silver halide 44 while unexposed silver halide 42 remains inactivated.

In FIG. 4b, display sheet 10 has been photographically developed to convert exposed silver halide 44 to metallic silver 46. Barrier layer 20 prevents developing chemicals from contaminating light modulating layer 30. Metallic silver 46 forms conductive areas 16 in display sheet 10. In FIG. 4c, a conventional photographic fixing step has removed the unexposed silver halide 42. Removal of unexposed silver halide 42 forms non-conductive areas 18 in display sheet 10. Additionally, the conductive areas 16 of silver halide can be chemically plated with harder materials such as nickel to provide further abrasive strength and improve conductivity in conductive areas 16.

Figure 5A:
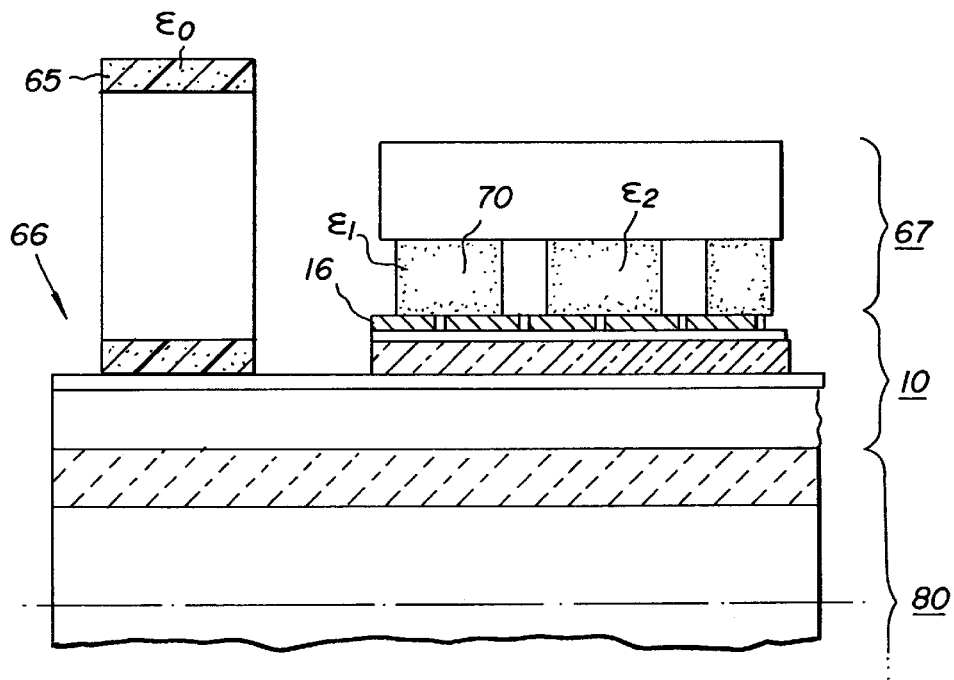
FIG. 5a is a front sectional view showing a writer writing to a processed sheet.
Figure 5B:
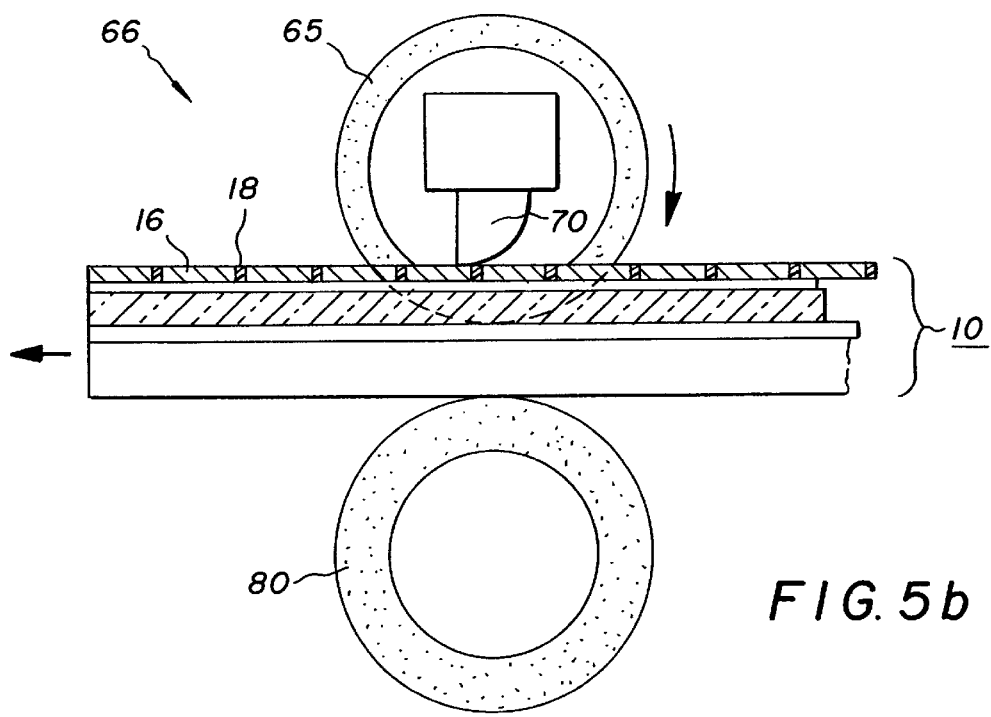

FIG. 5a is a front sectional view of a writer 66 used to write information on display sheet 10. FIG 5b is a side sectional view of writer 66. A pressure roller 80 is used to advance display sheet 10 (in arrow direction) through the writer 66. Power rollers 65 disposed to the sides of display sheet 10 contact power areas 35 to form an electrical connection to transparent, electrically conductive layer 13. A write head 67 supports a series of contact pads 70 which have a 300 dots per inch (dpi) pitch (82.5 micron) with 10 micron gaps between each contact pad 70. Contact pads 70 can be copper traces with a nickel overcoat. Each contact pad 70 contacts a plurality of conductive areas 16. Nonconductive areas 18 define a set of conductive areas 16 that record a pixel of image information.

Display sheet 10 is advanced under power roller 65 and sequential elements of image data are written to display sheet 10. A first electrical potential is applied across light modulating layer 30 to reset all pixels. A second electrical potential is then selectively applied to write gray levels onto display sheet 10. In the case of light modulating layer 30 being a polymer stabilized chiral nematic material, light modulating layer 30 will be transparent after the high voltage reset.

If the applied voltage is removed rapidly, the pixel returns to a reflective state. If the applied voltage is removed slowly, light modulating layer 30 will relax into a transparent state. Display sheet 10 is sequentially advanced to each line of pixels at approximately 3 milliseconds for each line of pixels. When the light modulating layer 30 includes an electrophoretic material, write head 67 applies fields of different polarities and in response thereto particles move to one of two states.

Figure 6:
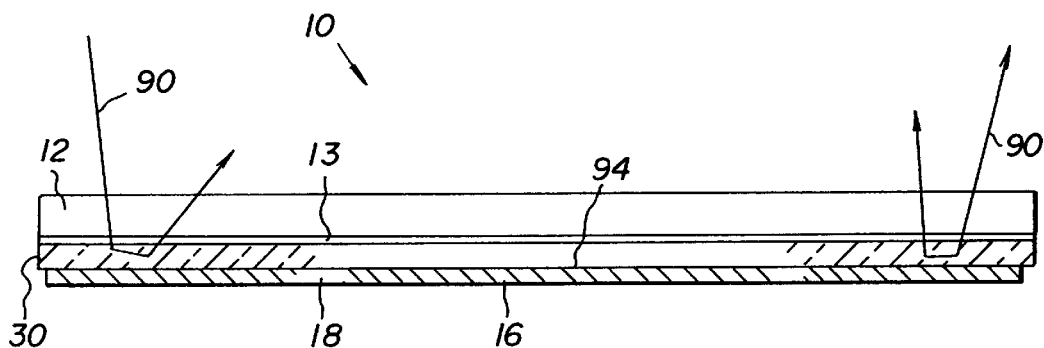
FIG. 6 is a sectional view showing the optical effect of a sheet on light.

FIG. 6 is a sectional view showing the optical effect of a display sheet 10 on light. In FIG. 6 the center of light modulating layer 30 over conductive areas 16 has been written into a transmissive, black state. Absorbed light 94 strikes the black silver material in conductive area 16 and is not reflected from display sheet 10. Conductive area 16 traps absorbed light 94, causing the pixel area to appear black in a normally white sheet. On the sides of sheet 10, light modulating layer 30 has been written into the reflective state and reflected light 90 forms a "white" pixel.

Figure 7:
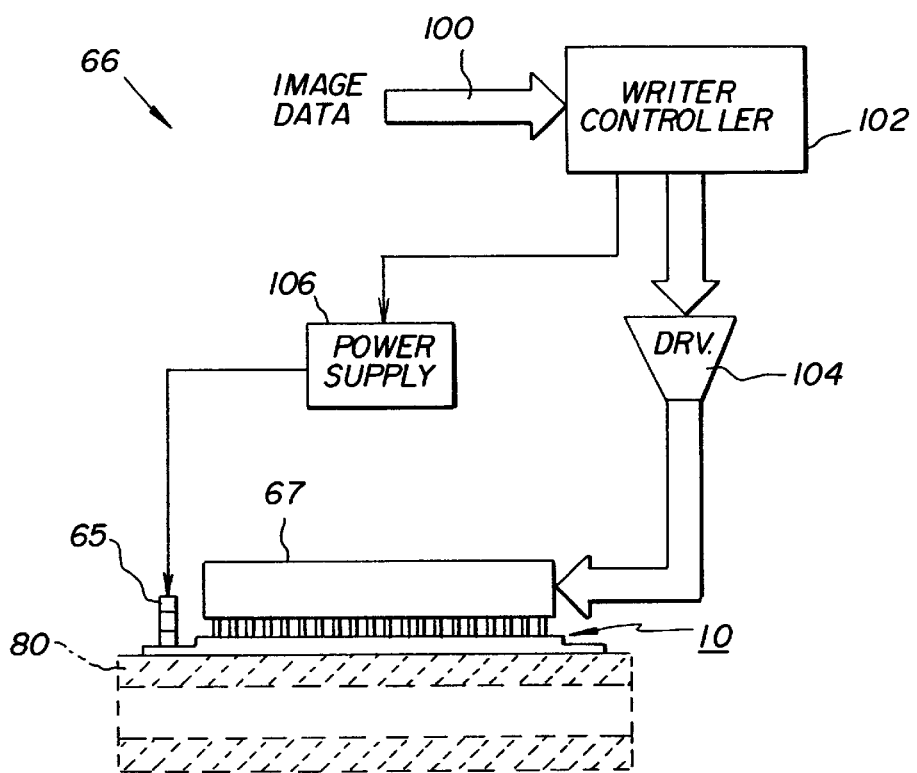
FIG. 7 is a schematic view of circuitry for writing on displays in accordance with the present invention.

FIG. 7 shows schematic circuitry for writing to the display sheet 10. Digital image data 100 is applied to a writer controller 102 and is stored in memory (not shown). These digital image data 100 are converted to electrical signals that are applied to drivers 104 which provide voltages to contact pads 70. Writer controller 102 controls power supply 106 to provide various voltage levels to power roller 65 that are required to initialize and write to display sheet 10. Display sheet 10 is advanced to a first line of pixels. A first low voltage is applied to the row of pixels on display sheet 10 which is then raised to drive all pixels to the clear state. The field for each individual pixel is dropped at different rates, corresponding to the degree of reflection required for each pixel that corresponds a given gray level of light reflectance. Display sheet 10 is then advanced a distance corresponding to the next row of pixels. The process is repeated until display sheet 10 contains a representation of digital image data 100.

The invention has been described in detail with particular reference to certain preferred embodiments thereof, but it will be understood that variations and modifications can be effected within the spirit and scope of the invention.

Parts List 10 sheet
12 substrate
13 transparent, electrically conductive layer
14 photosensitive layer
16 conductive areas
18 non-conductive areas 20 barrier layer
30 light modulating layer
35 power areas
40 photo mask
42 unexposed silver halide
44 exposed silver halide
46 metallic silver
60 reflected light
64 absorbed light
65 power roller
66 writer
67 write head
70 contact pad
80 pressure roller
90 reflected light
94 absorbed light
100 image data
102 writer controller
104 driver
106 power supply

What is claimed is:

1. A display sheet for presenting selected images to a viewer, comprising:
   (a) a transparent substrate;
   (b) a transparent, electrically conductive layer formed over the transparent substrate;
   (c) a light modulating layer formed over a portion of the transparent, electrically conductive layer being effective in a first stable state to reflect light and in a second stable state to transmit light;
   (d) a photosensitive layer formed over the light modulating layer which is adapted to be exposed and developed to provide conductive pixel areas, the photosensitive layer being arranged to form a plurality of separate conductive portions which are arranged to form pixel areas; and
   (e) electrical conduction means being adapted to be selectively connected to separate conductive portions of the photosensitive layer and being effective in a first condition to apply a first field across selected separate conductive portions of the light modulating layer which correspond to separate conductive portions on the photosensitive layer to be in the first stable state to reflect light and to apply a second field across selected portions of the light modulating layer which correspond to separate conductive portions on the photosensitive layer to be in the second stable state to transmit light.

2. The display sheet according to claim 1 wherein the photosensitive layer includes silver halide and the conductive areas are formed of developed silver.

3. The display sheet according to claim 2 wherein the electrically conductive means includes an electrically conductive roller which contacts a portion of the transparent, electrically conductive layer.

4. The display sheet according to claim 1 wherein the electrical conduction means includes contact means coupled to the transparent electrically conductive layer and electrodes connected separate conductive portions of the conductive pixel areas, and means for applying voltages across the contact means and the electrodes.

5. The display sheet according to claim 1 wherein the light modulating layer includes polymer stabilized cholesteric liquid crystal material.

6. The display sheet according to claim 5 wherein the polymer stabilized cholesteric liquid crystal material is gelatin.

7. The display sheet according to claim 1 wherein the transparent, electrically conductive layer is made of Indium-Tin-Oxide.

8. The display sheet according to claim 1 further including a barrier layer disposed between the light modulating layer and the photosensitive layer.

9. The display sheet according to claim 8 wherein the barrier layer includes a highly cross-linked gelatin.

10. The display sheet according to claim 9 wherein there are a number of selectable states which are a continuous tone image.

11. The display sheet according to claim 1 wherein the light modulating layer is effective in more than two states according to different electric fields applied across such light modulating layer.

* * * * *